(12) United States Patent
Boehm

(10) Patent No.: US 11,846,829 B2
(45) Date of Patent: *Dec. 19, 2023

(54) ADJUSTABLE VANITY MIRROR WITH HANGER BRACKET AND SUCTION CUP

(71) Applicant: Glen Robert Boehm, Austin, TX (US)

(72) Inventor: Glen Robert Boehm, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,543

(22) Filed: May 26, 2021

(65) Prior Publication Data

US 2021/0278628 A1    Sep. 9, 2021

Related U.S. Application Data

(63) Continuation of application No. 16/548,725, filed on Aug. 22, 2019, now Pat. No. 11,209,609.

(Continued)

(51) Int. Cl.
| | | |
|---|---|---|
| *G02B 7/198* | (2021.01) | |
| *F16B 47/00* | (2006.01) | |
| *F16M 11/28* | (2006.01) | |
| *F16M 11/14* | (2006.01) | |
| *A45D 42/10* | (2006.01) | |

(Continued)

(52) U.S. Cl.
CPC ............. *G02B 7/198* (2013.01); *A45D 42/10* (2013.01); *A45D 42/14* (2013.01); *A47G 1/02* (2013.01); *F16B 47/00* (2013.01); *F16M 11/14* (2013.01); *F16M 11/28* (2013.01); *A47G 2001/002* (2013.01)

(58) Field of Classification Search
CPC ........ G02B 7/198; A45D 42/10; A45D 42/14; A47G 1/02; A47G 2001/002; F16B 47/00; F16M 11/28; F16M 11/14

USPC .................................................. 359/872, 881
See application file for complete search history.

(56) References Cited

U.S. PATENT DOCUMENTS

| | | | |
|---|---|---|---|
| 1,006,315 A | * | 10/1911 | Toth .......................... A47G 1/17 |
| | | | 248/467 |
| 2,146,859 A | | 2/1939 | Seklehner |

(Continued)

FOREIGN PATENT DOCUMENTS

| | | |
|---|---|---|
| CN | 203987192 | 12/2014 |
| CN | 204146740 | 2/2015 |

OTHER PUBLICATIONS

Simplehuman Sensor Mirror Trio, https://www.simplehuman.com/sensor-mirrors/round/trio, available at least as of Aug. 10, 2018.

(Continued)

*Primary Examiner* — Ricky D Shafer
(74) *Attorney, Agent, or Firm* — Byrne Poh LLP

(57) ABSTRACT

The invention comprises a hands-free, adjustable telescoping magnifying mirror. The mirror may have a first reflective surface and a second reflective surface and can be secured to a horizontal or vertical surface using a suction cup base or can be hung over a door or ledge using a retractable hanger bracket. A telescoping rod is attached to the suction cup base. The mirror may be extended from the base by extending the telescoping rod and the mirror assembly can stand freely without falling over, whether the suction cup base is engaged or not. Additionally, one or more light sources may be disposed at a periphery of the first reflective surface or second reflective surface.

15 Claims, 18 Drawing Sheets

Related U.S. Application Data

(60) Provisional application No. 62/722,749, filed on Aug. 24, 2018.

(51) Int. Cl.
  *A45D 42/14* (2006.01)
  *A47G 1/02* (2006.01)
  *A47G 1/00* (2006.01)

(56) References Cited

U.S. PATENT DOCUMENTS

| | | |
|---|---|---|
| D159,100 S | 6/1950 | Ryder |
| 2,880,651 A | 4/1959 | Fenyo |
| 2,915,944 A * | 12/1959 | Butts .................. G02B 5/08 248/467 |
| 3,392,950 A | 7/1968 | Pierce |
| 3,476,927 A | 11/1969 | Rothman |
| D216,414 S | 12/1969 | Hanson |
| 3,781,093 A | 12/1973 | Gabijas |
| 4,067,535 A | 1/1978 | Rose |
| D298,087 S | 10/1988 | Arce |
| D298,183 S | 10/1988 | Bruse |
| 4,856,888 A | 8/1989 | Wahi |
| D307,678 S | 5/1990 | Lookerse |
| D309,833 S | 8/1990 | Wahl |
| 4,950,065 A | 8/1990 | Wyman |
| D310,584 S | 9/1990 | Cadet |
| D316,635 S | 5/1991 | Smith |
| 5,411,230 A | 5/1995 | Messinger |
| 5,453,915 A * | 9/1995 | Bradley, III .......... A45D 42/10 362/135 |
| 5,784,213 A | 7/1998 | Howard |
| 6,130,790 A | 10/2000 | Tu |
| D438,389 S | 3/2001 | Ross |
| 6,206,530 B1 | 3/2001 | Eberts |
| D444,634 S | 7/2001 | Dodson |
| 6,305,809 B1 | 10/2001 | Zadro |
| 6,398,378 B1 | 6/2002 | Shieh |
| 6,840,639 B2 | 1/2005 | Zadro |
| 6,854,852 B1 | 2/2005 | Zadro |
| D505,555 S | 5/2005 | Snell |
| D508,883 S | 8/2005 | Falconer |
| 6,932,374 B1 | 8/2005 | Timms |
| D512,841 S | 12/2005 | Dirks |
| 7,048,406 B1 * | 5/2006 | Shih .................. A45D 42/10 362/135 |
| 7,090,378 B1 | 8/2006 | Zadro |
| D532,981 S | 12/2006 | Zadro |
| D547,555 S | 7/2007 | Lo |
| D563,679 S | 3/2008 | Vidmar |
| 7,341,356 B1 | 3/2008 | Zadro |
| D574,159 S | 8/2008 | Howard |
| 7,416,205 B1 | 8/2008 | Sam |
| 7,562,980 B2 | 7/2009 | Rymniak |
| 7,635,111 B2 | 12/2009 | Hara et al. |
| 7,651,229 B1 | 1/2010 | Rimback |
| 8,162,502 B1 | 4/2012 | Zadro |
| D670,087 S | 11/2012 | Walker |
| 8,348,216 B2 | 1/2013 | Hajianpour |
| 8,356,908 B1 | 1/2013 | Zadro |
| 8,556,447 B2 | 10/2013 | Griggs |
| 8,584,997 B2 | 11/2013 | Hajianpour |
| D701,050 S | 3/2014 | Yang et al. |
| D713,056 S | 9/2014 | Gulick |
| D727,630 S | 4/2015 | Zadro |
| D736,001 S | 8/2015 | Yang et al. |
| 9,170,353 B2 | 10/2015 | Chang |
| D751,829 S | 3/2016 | Yang et al. |
| D754,446 S | 4/2016 | Yang et al. |
| 9,347,660 B1 | 5/2016 | Zadro |
| 9,611,990 B2 | 4/2017 | Ellis |
| D785,345 S | 5/2017 | Yang et al. |
| 9,638,410 B2 | 5/2017 | Yang et al. |
| D801,703 S | 11/2017 | Robertson |
| D802,942 S | 11/2017 | Nikolov |
| 9,897,306 B2 | 2/2018 | Yang et al. |
| D816,350 S | 5/2018 | Yang et al. |
| D824,681 S | 8/2018 | Vaughn |
| D841,342 S | 2/2019 | Melocchi |
| D846,890 S | 4/2019 | Smrstick |
| D873,034 S | 1/2020 | Boehm |
| D877,521 S | 3/2020 | Boehm |
| D877,522 S | 3/2020 | Boehm |
| 11,209,609 B2 * | 12/2021 | Boehm .................. G02B 7/198 |
| 2004/0020509 A1 * | 2/2004 | Waisman ............... A45D 42/10 132/316 |
| 2004/0094934 A1 | 5/2004 | Teague |
| 2004/0165294 A1 * | 8/2004 | Dunn ........................ B60R 1/04 359/872 |
| 2004/0233556 A1 | 11/2004 | LaViola |
| 2005/0146863 A1 * | 7/2005 | Mullani ............... G02B 27/281 362/140 |
| 2007/0247692 A1 | 10/2007 | Rymniak |
| 2010/0296298 A1 | 11/2010 | Martin, Jr. |
| 2017/0068149 A1 | 3/2017 | Fromm |
| 2017/0164719 A1 | 6/2017 | Wheeler |
| 2018/0263362 A1 | 9/2018 | Yang et al. |
| 2019/0328113 A1 * | 10/2019 | Long ...................... A45D 42/16 |
| 2020/0281342 A1 | 9/2020 | Austin |

OTHER PUBLICATIONS

Simplehuman Sensor Mirror Compact https://www.simplehuman.com/sensor-mirrors/compact, available at least as of Aug. 10, 2018.

Simplehuman Sensor Mirror Pro, https://www.simplehuman.com/sensor-mirrors/wide-view-pro, available at least as of Aug. 10, 2018.

Simplehuman Sensor Mirror, https://www.simplehuman.com/wall-mount-sensor-mirror, available at least as of Aug. 10, 2018.

Simplehuman Sensor Mirror Pro https://www.simpiehuman.com/sensor-mirrors/round/round-pro, available at least as of Aug. 10, 2018.

Magnifying mirror intelligent 6x or 10x TWISTMIRROR, https://www.twistmirror.com/en/twistmirror/47-twistmirror-the-intelligent-magnifying-mirror-6x-or-10x.html, available at least as of Aug. 10, 2018.

Belmont Estate Vanity Mirror, https://www.frontgate.com/belmont-estate-vanity-mirror/731085, available at least as of Aug. 10, 2018.

LED Articulating Rechargeable Vanity Mirror, https://www.frontgate.com/led-articulating-rechargeable-vanity-mirror/1097 010, available at least as of Aug. 10, 2018.

Jerdon 8-Inch Round Lighted Wall Mount Mirror, https://www.bedbathandbeyond.com/store/product/jerdon-reg-8-inch-round-light ed-wall-mount-mirror/3311500, available at least as of Aug. 10, 2018.

Conair Rose 1x/5x Lighted Vanity Mirror in Gold, https://www.bedbathandbeyond.com/store/product/conair-reg-rose-1x-5x-lighted -vanity-mirror-in-gold/1062682275, available at least as of Aug. 10, 2018.

Conair Fluorescent 1x/10x/15x Fluorescent Mirror with Satin Nickle Finish, https://www.bedbathandbeyond.com/store/product/conair-reg-fluorescent-1x-10x-15x-fluor escent-mirror-with-satin-nickel-finish/1015960540, available at least as of Aug. 10, 2018.

Mirrotek Over the Door Mirror, https://www.amazon.com/Mirrotek-Over-the-Door-Mirror/dp/B00UL43110, available at least as of Apr. 4, 2016.

Mar. 16, 2021 Office Action in U.S. Appl. No. 15/548,725.

Notice of Allowance Jan. 6, 2020 in U.S. Appl. No. 29/661,201, pp. 1-10.

Notice of Allowance Jan. 6, 2020 in U.S. Appl. No. 29/661,202, pp. 1-10.

Notice of Allowance Oct. 2, 2019 in U.S. Appl. No. 29/661,199, pp. 1-30.

Notice of Allowance dated Sep. 19, 2022 in U.S. Appl. No. 17/537,303, pp. 1-24.

Office Action dated Mar. 16, 2021 in U.S. Appl. No. 16/548,725, pp. 1-18.

(56) References Cited

OTHER PUBLICATIONS

Office Action dated Jun. 6, 2023 in U.S. Appl. No. 18/072,052, pp. 1-17.
Office Action dated Sep. 24, 2019 in U.S. Appl. No. 29/661,201, pp. 1-23.
Office Action dated Sep. 24, 2019 in U.S. Appl. No. 29/661,202, pp. 1-23.

\* cited by examiner

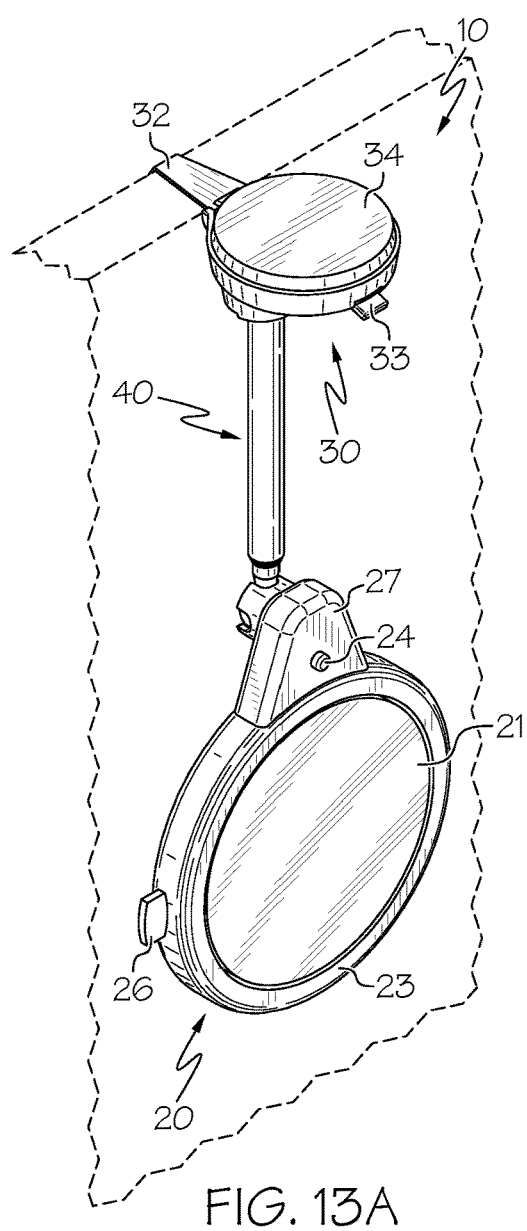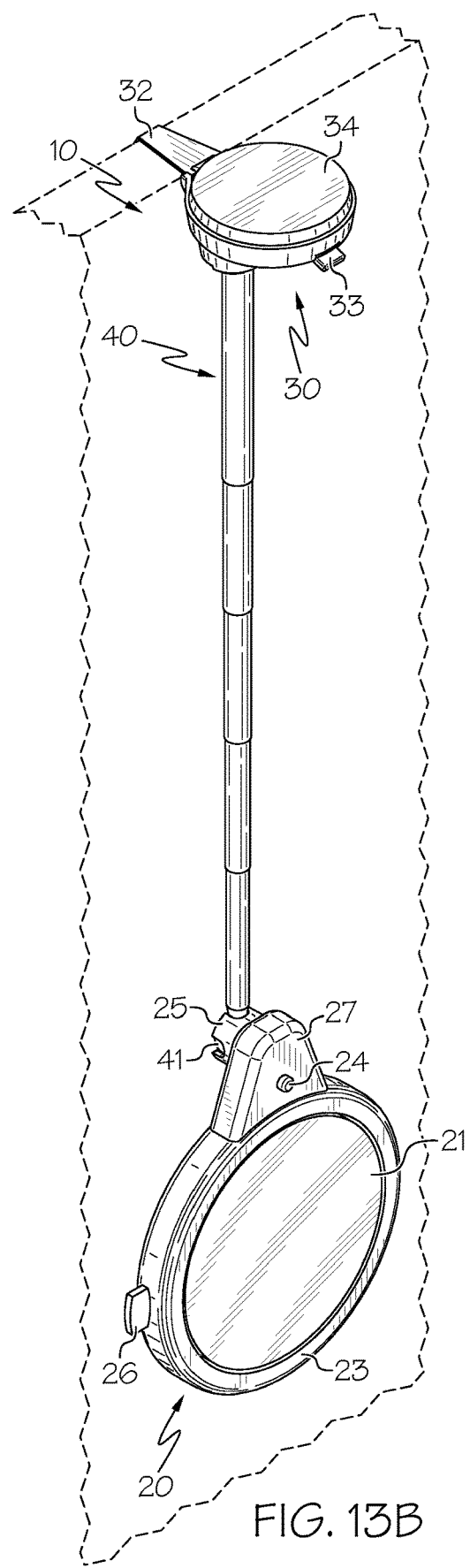
FIG. 13A
FIG. 13B

ADJUSTABLE VANITY MIRROR WITH HANGER BRACKET AND SUCTION CUP

CROSS-REFERENCES TO RELATED APPLICATION

This application is a continuation application of, and claims priority to, U.S. patent application Ser. No. 16/548,725, filed Aug. 22, 2019, now U.S. Pat. No. 11,209,609, which claims the benefit of prior Provisional Application No. 62/722,749, filed on Aug. 24, 2018, each of which is incorporated by reference as though fully set forth herein.

FIELD OF THE INVENTION

The present disclosure relates generally to vanity mirrors.

BACKGROUND OF THE INVENTION

Vanity mirrors are reflective devices that are typically used for personal grooming, shaving, applying makeup, or the like.

Vanity mirrors are available in various configurations, including wall-mounted, free-standing, and hand-held. A common problem, however, with each of these configurations is that users of the mirror must reposition themselves to obtain the desired distance from the reflective surface and the requisite height for the reflective surface to be viewable. This repositioning is particularly undesirable when the user is required to bend over to reach the desired height and distance, which may cause back and neck pain. In the case of a hand-held mirror, the user may be able to reposition the mirror but must hold the mirror at the desired location, thereby reducing their ability to perform the required grooming tasks.

The present invention solves these problems by providing a hands-free, adjustable mirror assembly with a suction cup base, hanger bracket, and light source. The suction cup base allows the user to position the mirror assembly at the desired distance, height, and angle from the user while maintaining the stability of the mirror assembly. Additionally, the hanger bracket permits the user to hang the mirror assembly at the desired height and position over a door or ledge while maintaining the stability of the mirror assembly. These features permit the user of the present invention to stand or sit, as desired, and permit the user to move the mirror assembly disclosed herein to the desired location rather than bending over to reach the desired distance from the reflective surface, thereby potentially avoiding causing back and neck pain. The ability to hang the present mirror assembly over a door or ledge also provides the user with the ability to utilize the mirror assembly in a variety of locations.

BRIEF SUMMARY OF THE INVENTION

The present invention relates to a novel mirror assembly comprising a mirror, suction cup base with a hanger bracket, and an adjustable telescoping rod.

A hands-free, adjustable telescoping magnifying mirror with a light source is provided. The mirror can be secured to a horizontal or vertical surface using a suction cup base or can be hung over a door or ledge using a retractable hanger bracket. A telescoping rod is attached to the suction cup base. The mirror may be extended from the base by extending the telescoping rod and the mirror assembly can stand freely without falling over, whether the suction cup base is engaged or not. A smooth disc may also supplied to increase stability of the mirror assembly by removably mounting the suction cup base to the disc, giving the base a larger footprint.

BRIEF DESCRIPTION OF THE DRAWINGS

FIG. 13A illustrates a front perspective view of an embodiment of a mirror assembly with the hanger bracket extended and engaged over a door or ledge.

FIG. 13B illustrates a front perspective view of an embodiment of a mirror assembly with the hanger bracket extended and engaged over a door or ledge.

DETAILED DESCRIPTION OF CERTAIN EMBODIMENTS

Figure 1:
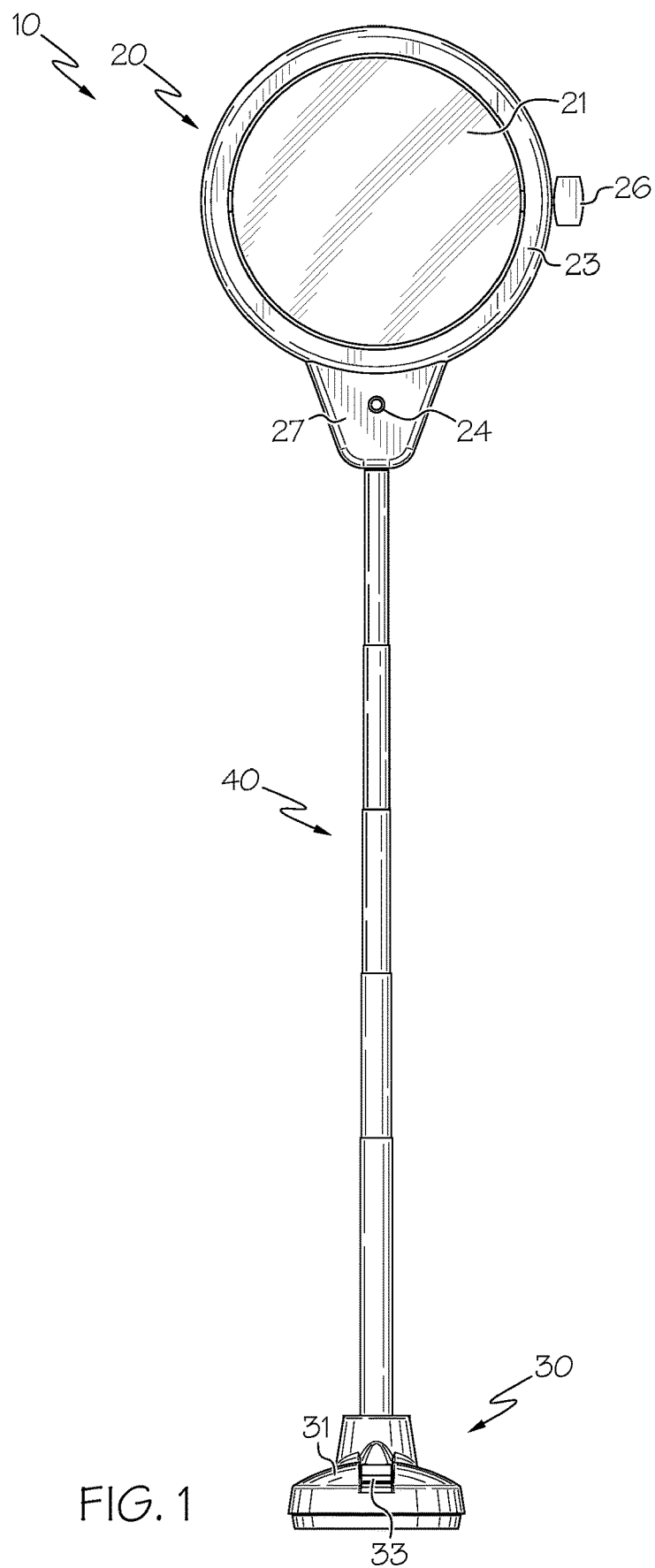
FIG. 1 illustrates a front view of an embodiment of a mirror assembly with the telescoping rod extended and trigger arm engaged.
Figure 2:
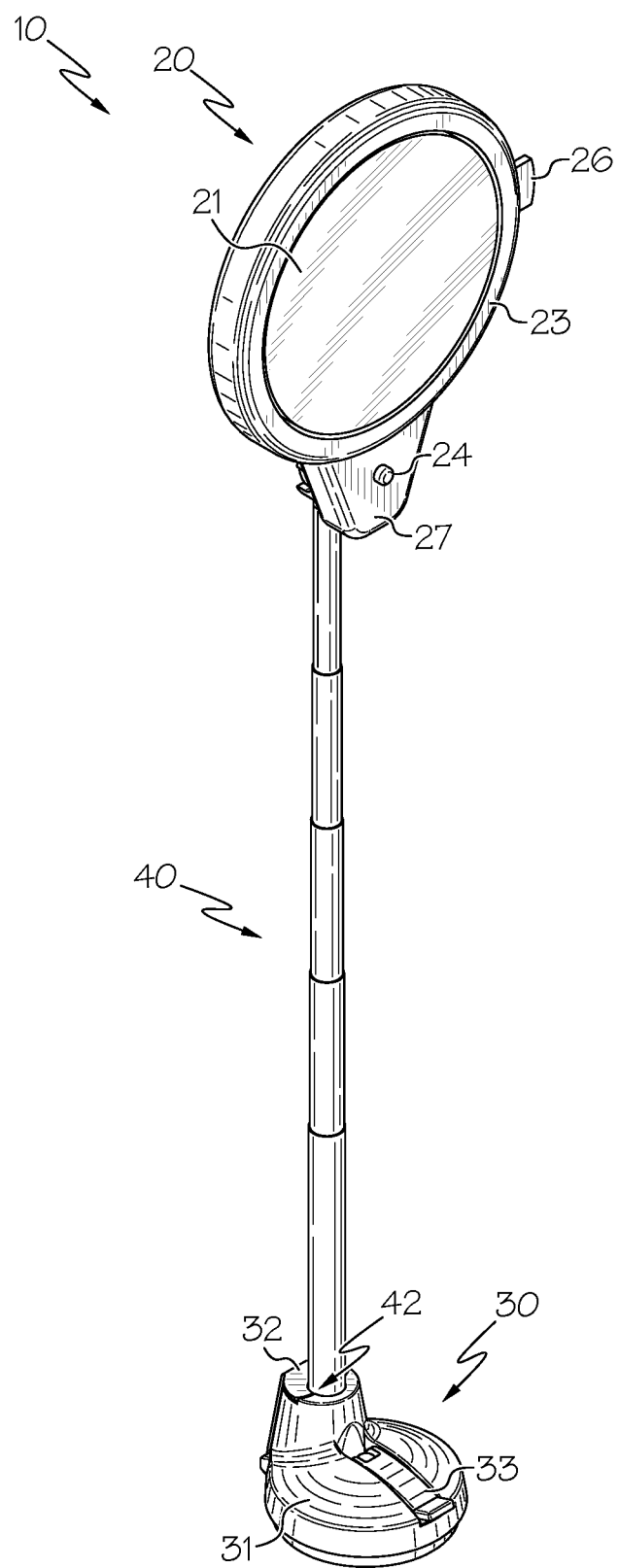
FIG. 2 illustrates a front perspective view of an embodiment of a mirror assembly with the telescoping rod extended, trigger arm engaged, and hanger bracket retracted.
Figure 3:
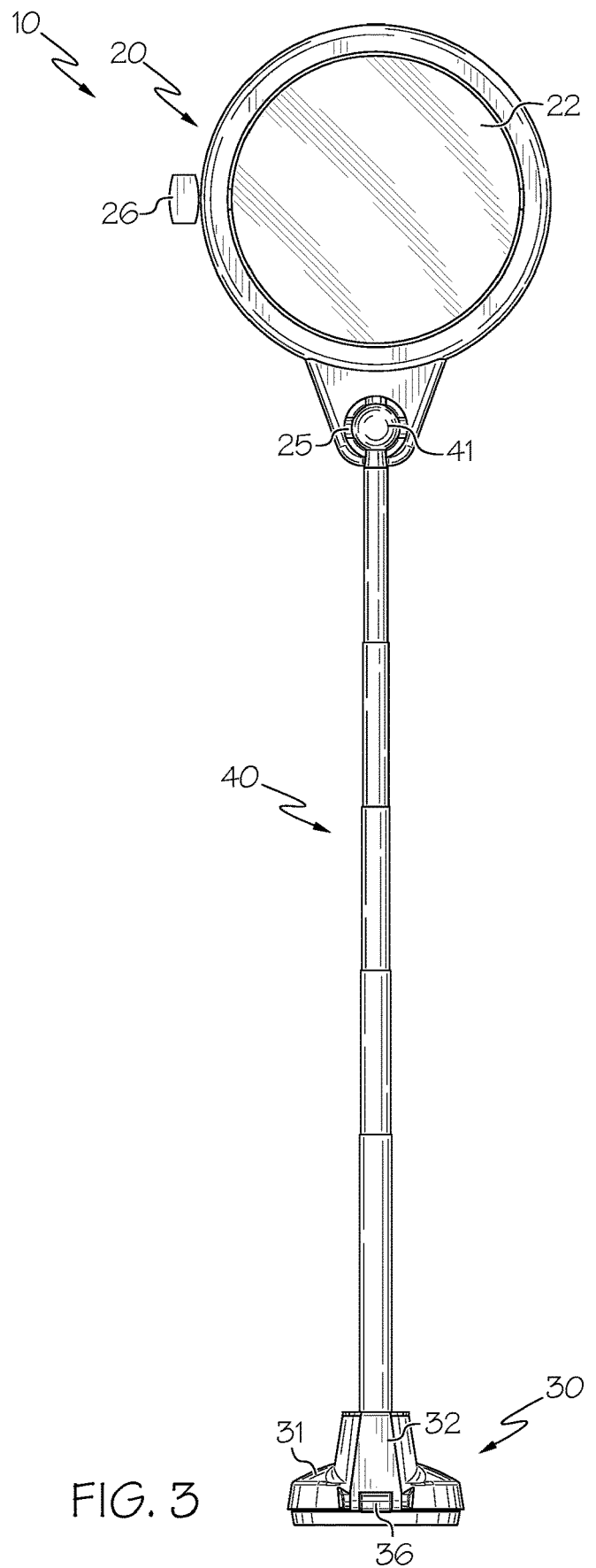
FIG. 3 illustrates a rear view of an embodiment of a mirror assembly with the telescoping rod extended and hanger bracket retracted.

In one embodiment, a mirror assembly 10 comprises a mirror 20, a suction cup base assembly 30, and a telescoping rod 40. Mirror 20 may have a first reflective surface 21 on a first side and a second reflective surface 22 on a second side. Additionally, there may be one or more light sources 23 disposed at a periphery of first reflective surface 21 or second reflective surface 22. The light source or sources 23 may be powered by a battery (e.g., a rechargeable battery) or may be plugged into an electrical outlet, for example. The light source or sources 23 may be activated and deactivated by a switch 24, or the like, which may be located adjacent the light source 23 on the front side of housing 27, or on the reverse side, for example. Switch 24 may be a push-button toggle switch, for example, or may be a rotatable knob that allows a user to adjust the intensity of light emitted by light source 23 by rotating the knob in a clockwise or counter-clockwise direction. Housing 27 may have a socket 25 for use in a ball joint by which a first end 41 of telescoping rod 40 may be secured to housing 27. The mirror 20 may also have a lever 26 that when triggered rotates reflective surfaces 21 and 22 relative to light source or sources 23 about an axis normal to the vertical axis of telescoping rod 40, for example, thereby allowing a user to view the reflective surface that provides the desired magnification level. A person of ordinary skill in the art would understand that other methods and axes of rotation may be used to rotate reflective surfaces 21 and 22. Each reflective surface 21 and 22 may be non-magnifying or may be magnifying, and each may provide level a of magnification of, for example, 1×, 3×, 5×, 7×, 10×, 15×, or 20×.

In some embodiments, the suction cup base assembly 30 is substantially hemispherical in shape, comprising a round, flexible, concave diaphragm 34 (i.e., a suction cup) on the front side of the planar surface of the hemisphere. The suction cup base assembly 30 can comprise multiple suction cups, but preferably uses only one suction cup 34 in order to reduce the size and weight of the mirror assembly 10, thereby increasing portability. The suction cup 34 may be used to removably mount the mirror assembly 10 to a horizontal or vertical surface. The suction cup 34 may be a locking suction cup or a non-locking suction cup. A housing portion 31 is disposed on the reverse side of the planar surface of the hemisphere. The housing portion 31 is preferably made of a water-, abrasion-, and stain-resistant material, such as plastic. A material such as plastic will resist discoloration and rust that may occur due to conditions in which the mirror assembly may be utilized, e.g., in a damp environment such as a bathroom, adjacent to a water source such as a sink, or near substances that may stain or discolor such as makeup or other grooming products. The plastic material from which the housing portion 31 of the suction cup assembly 30 is preferably comprised may also be flexible such that it will not crack or break if the mirror assembly 10 is dropped. If the suction cup 34 is a locking suction cup, the housing portion 31 of the suction cup assembly 30 may also include a trigger arm 33 for engaging the suction cup 34 such that it becomes removably mounted to a horizontal or vertical surface. Additionally, due to the conditions in which the mirror assembly 10 may be utilized, e.g., in a damp environment such as a bathroom, or adjacent to a water source such as a sink, it is preferable for the trigger arm 33 to be comprised of a water- and rust-resistant material such as stainless steel or aluminum. Those of skill in the art, however, would understand that the trigger arm 33 can be comprised of any suitable material.

The suction cup base assembly 30 may also include a hanger bracket 32. The hanger bracket 32 provides support for the mirror assembly 10 to be hung in an inverted manner on a door, a ledge, or the like. To permit the mirror assembly 10 to be hung in an inverted manner from a door, ledge, or the like, the hanger bracket 32 preferably has an internal dimension sufficient to accommodate the minimum and maximum standard thickness of an interior door. The hanger bracket 32 may be shaped as shown, for example, in FIGS. 9, 10, and 13, or may be shaped in any manner suitable to allow it to support the mirror assembly 10 over a door, ledge, or the like. The hanger bracket 32 is preferably made of metal, such as stainless steel, so that it can adequately support the mirror assembly 10 and is preferably thin enough to permit the door on which the mirror assembly 10 may be hung to be closed. Additionally, due to the conditions in which the mirror assembly 10 may be utilized, e.g., in a damp environment such as a bathroom, or adjacent to a water source such as a sink, it is preferable for the hanger bracket 32 to be comprised of a water- and rust-resistant material such as stainless steel. Those of skill in the art, however, would understand that the hanger bracket 32 can be comprised of any suitable material.

Figure 4:
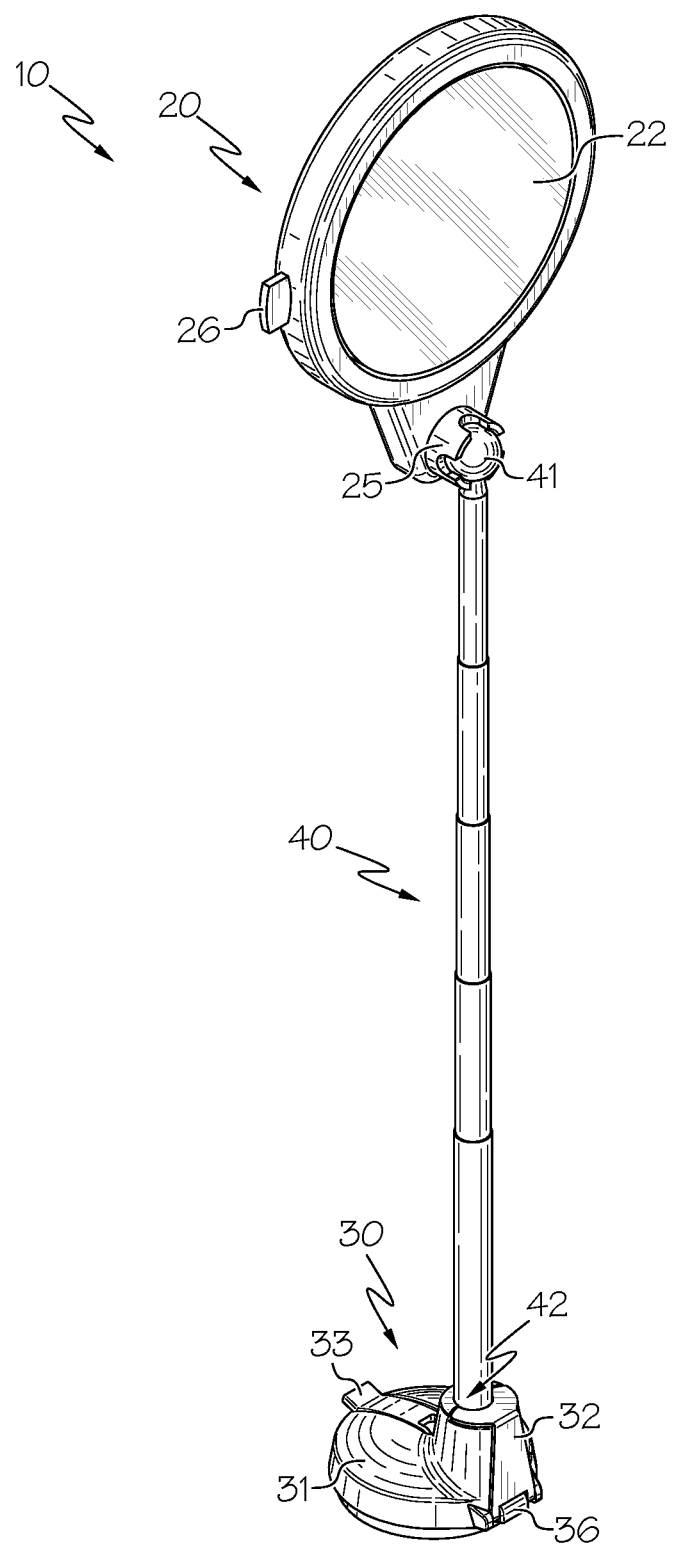
FIG. 4 illustrates a rear perspective view of an embodiment of a mirror assembly with the telescoping rod extended, trigger arm engaged, and hanger bracket retracted.
Figure 5:
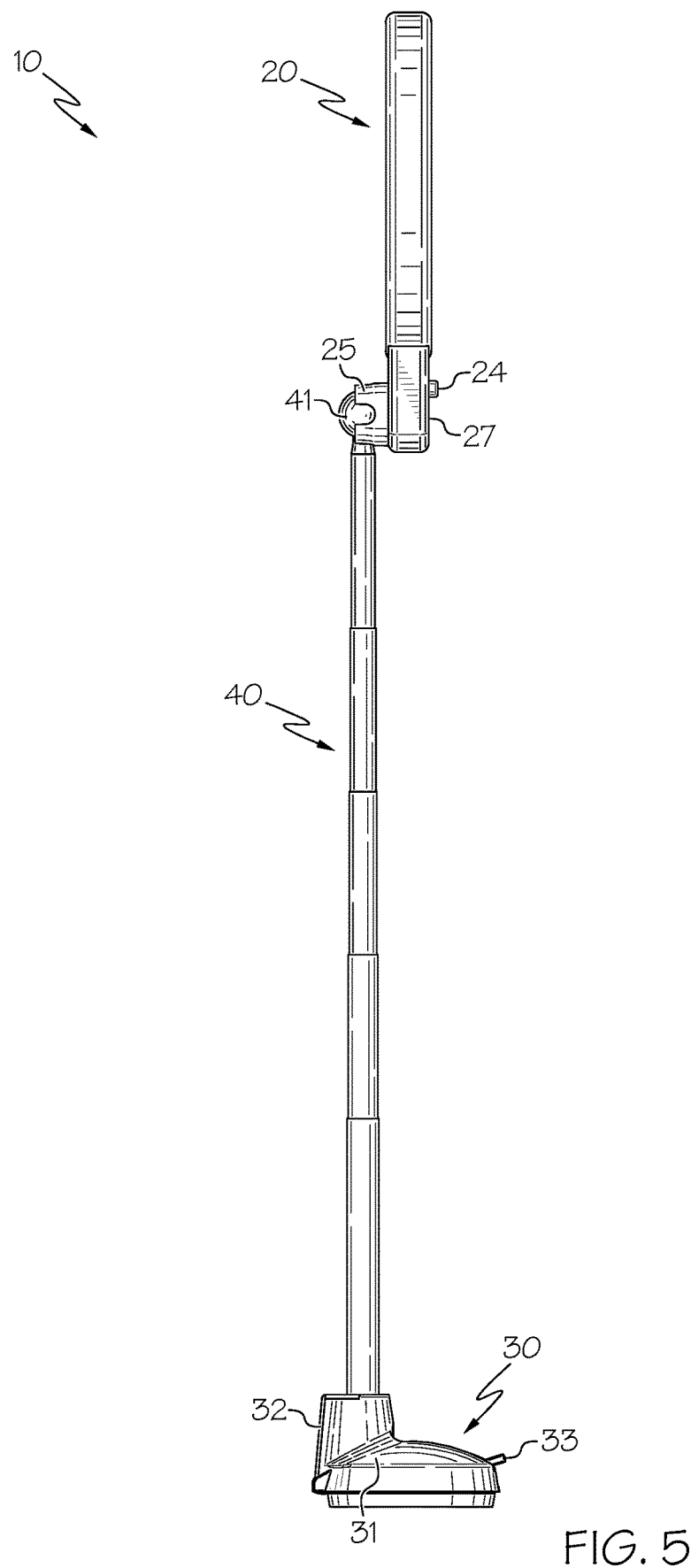
FIG. 5 illustrates a side view of an embodiment of a mirror assembly with the telescoping rod extended, trigger arm engaged, and hanger bracket retracted.
Figure 6:
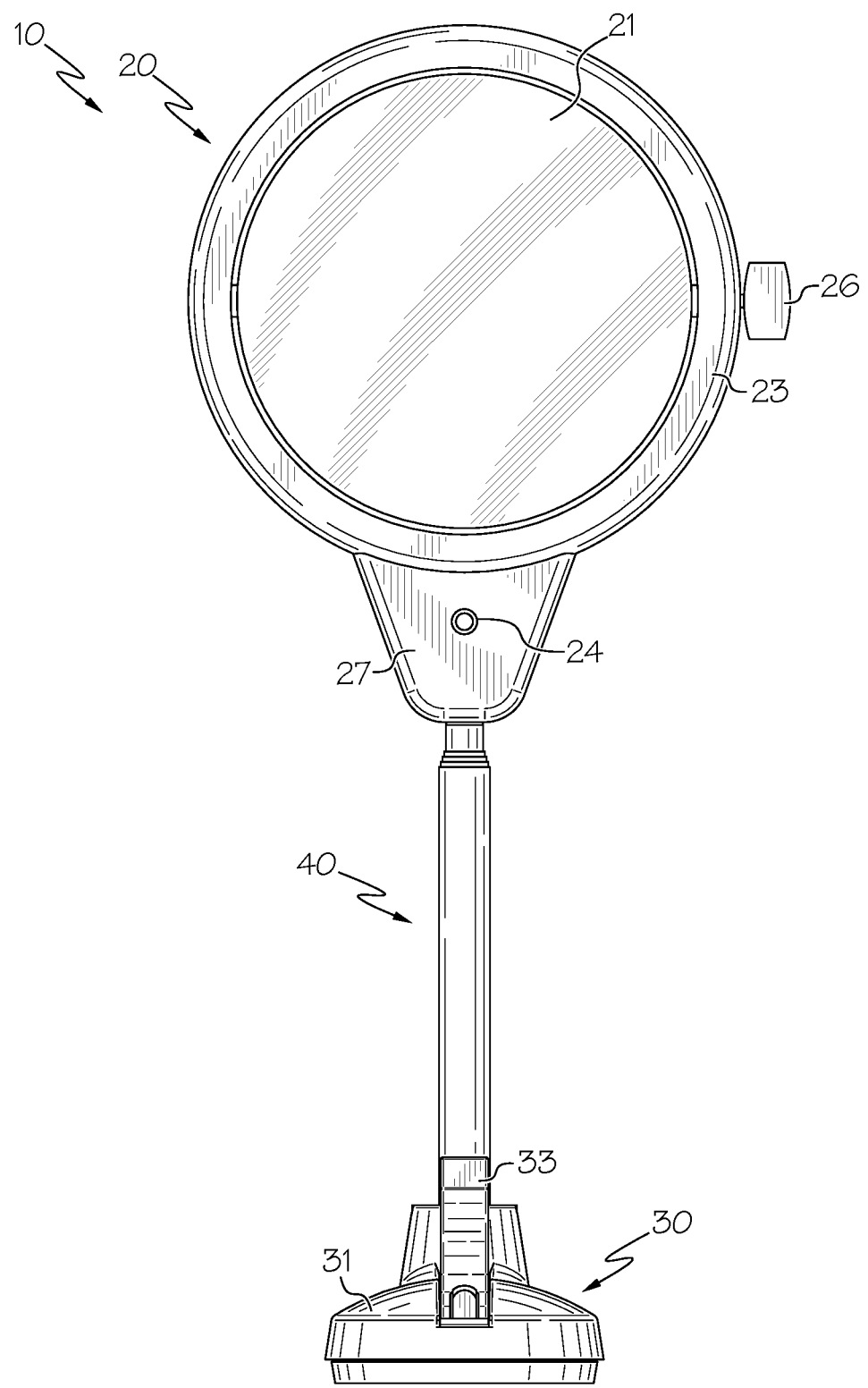
FIG. 6 illustrates a front view of an embodiment of a mirror assembly with the telescoping rod retracted and trigger arm disengaged.
Figure 7:
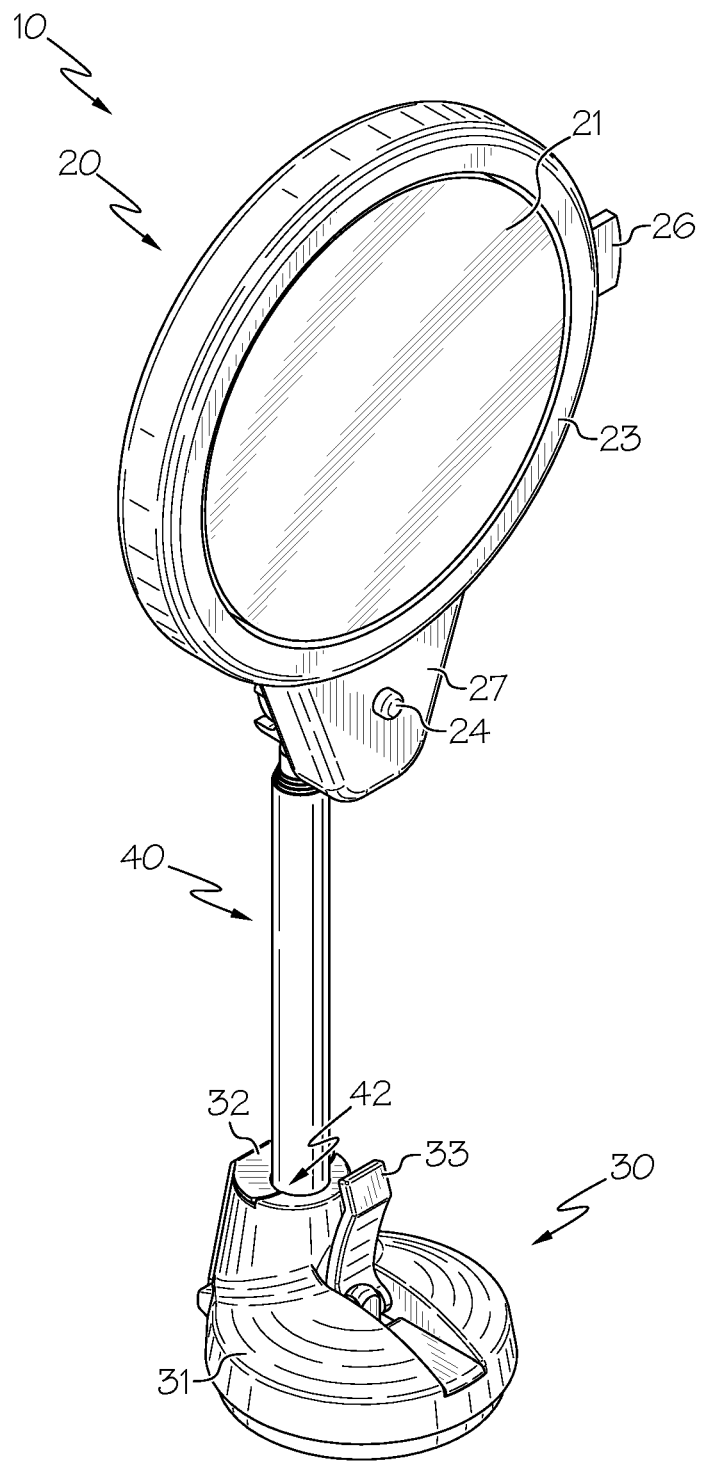
FIG. 7 illustrates a front perspective view of an embodiment of a mirror assembly with the telescoping rod retracted, trigger arm disengaged, and hanger bracket retracted.
Figure 8:
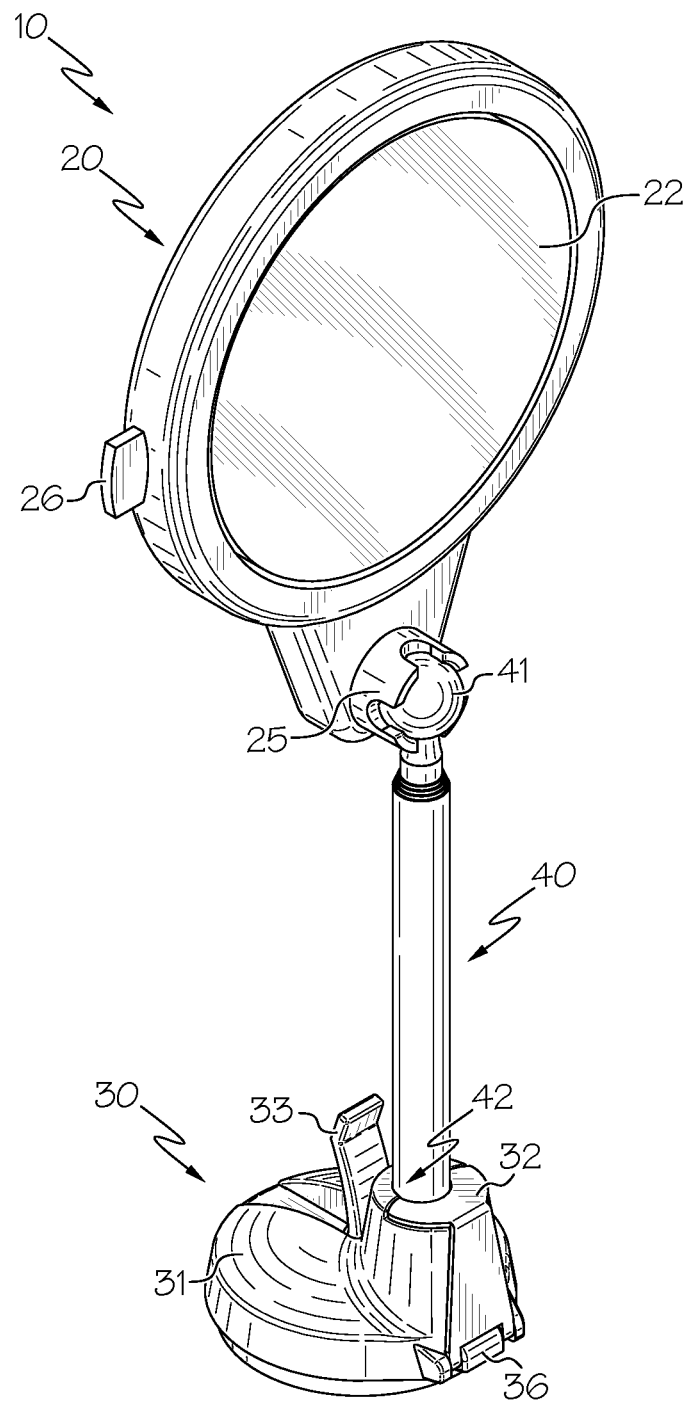
FIG. 8 illustrates a rear perspective view of an embodiment of a mirror assembly with the telescoping rod retracted, trigger arm disengaged, and hanger bracket retracted.
Figure 9:
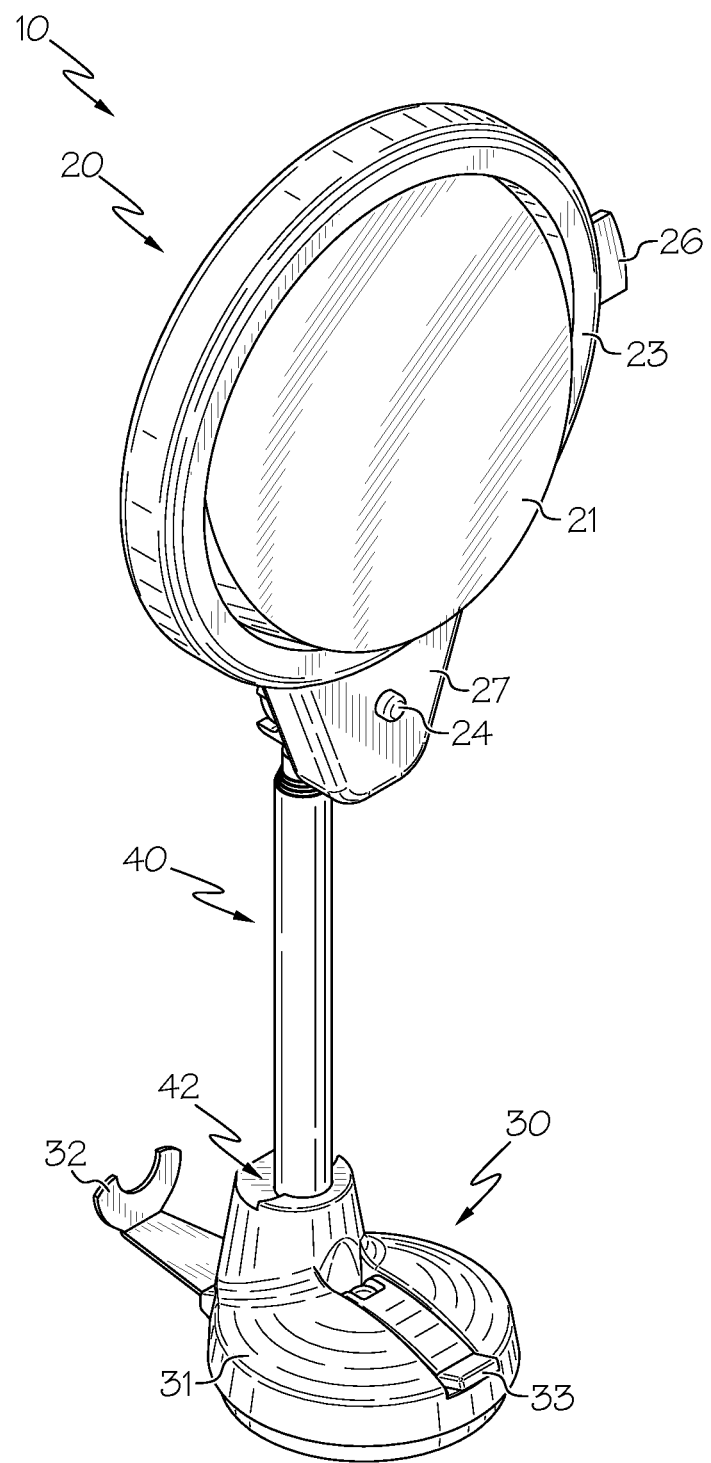
FIG. 9 illustrates a front perspective view of an embodiment of a mirror assembly with the telescoping rod retracted, trigger arm engaged, hanger bracket extended, and reflective surfaces partially rotated.
Figure 10:
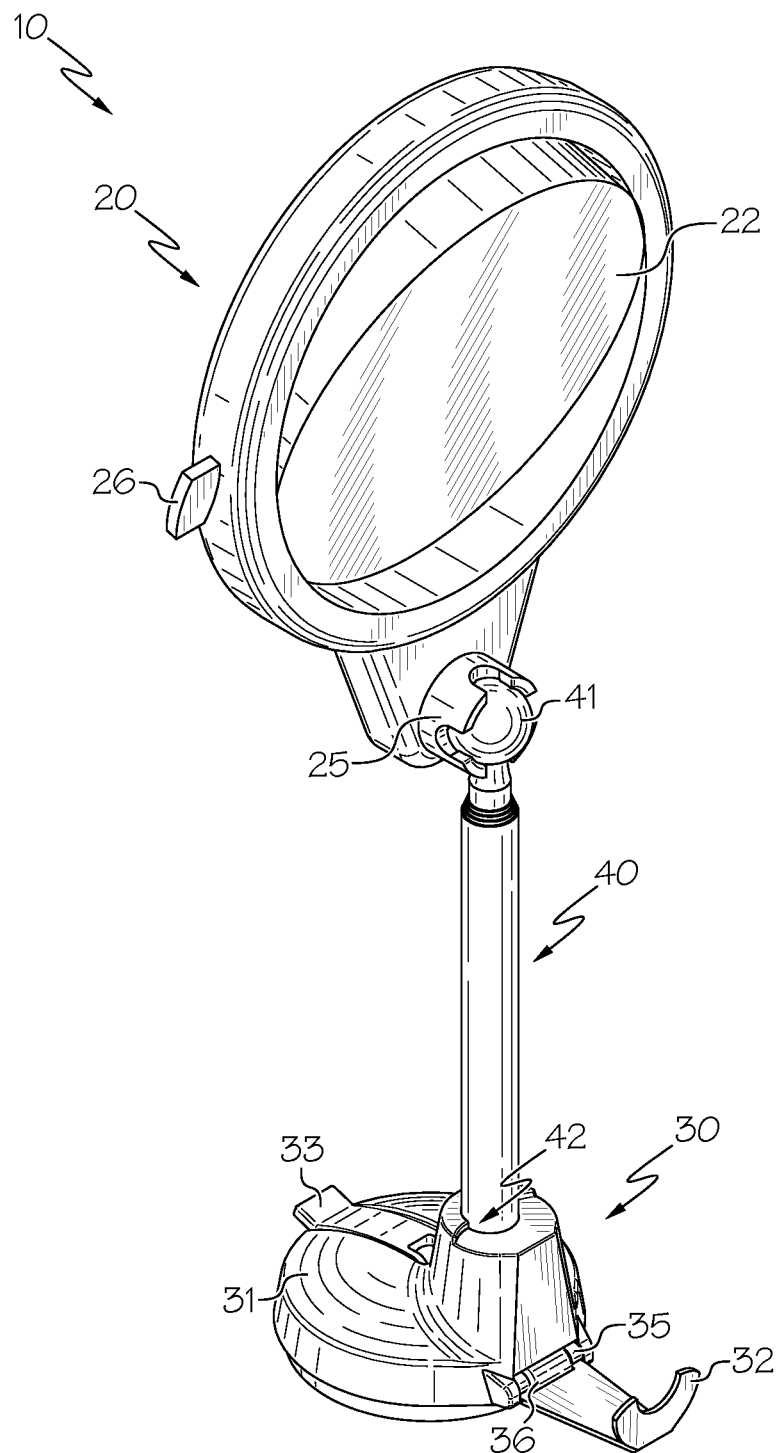
FIG. 10 illustrates a rear perspective view of an embodiment of a mirror assembly with the telescoping rod retracted, trigger arm engaged, hanger bracket extended, and reflective surfaces partially rotated.
Figure 11A:
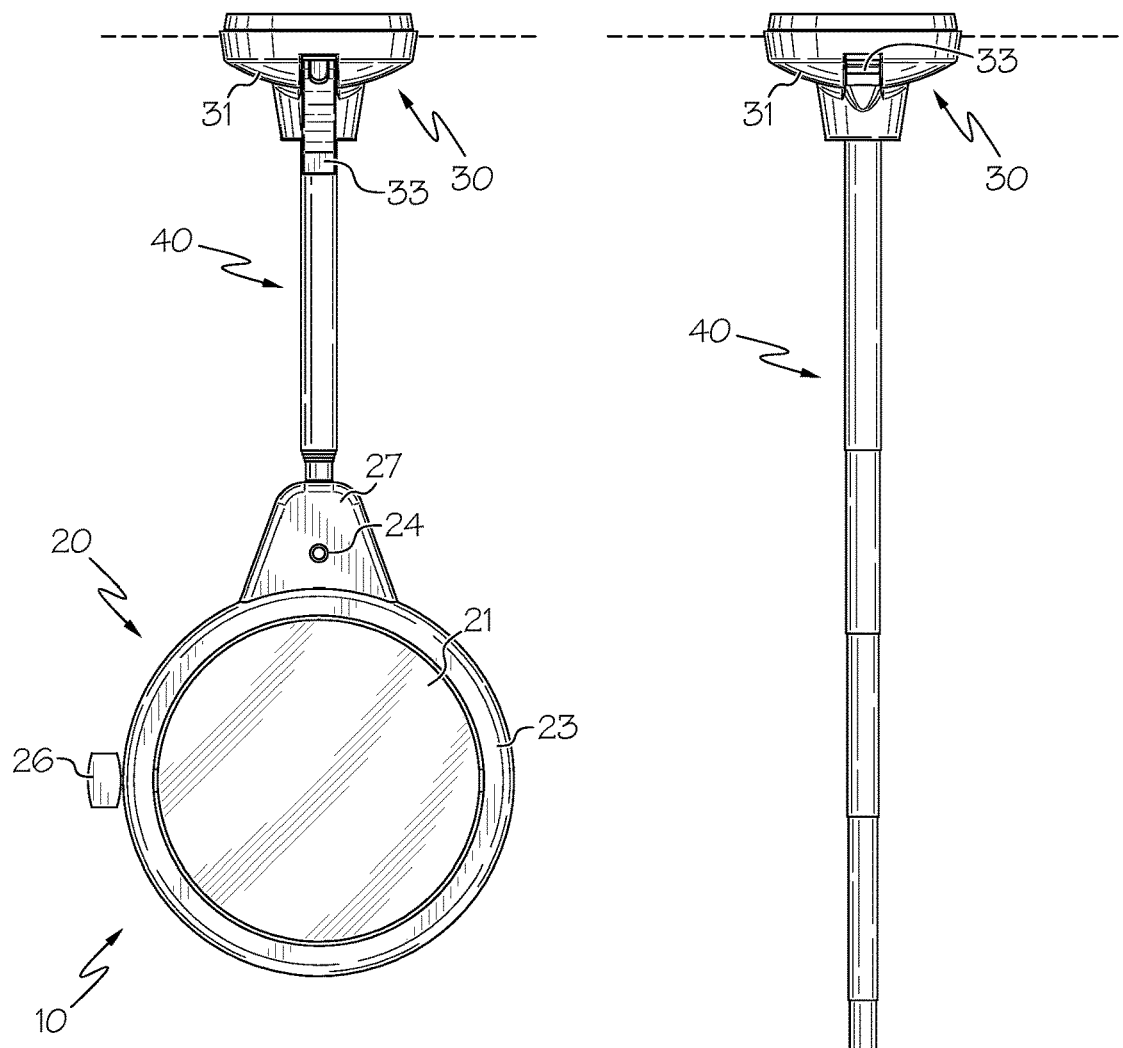
FIG. 11A illustrates a front view of an embodiment of a mirror assembly with the hanger bracket extended and engaged over a door or ledge.
Figure 11B:
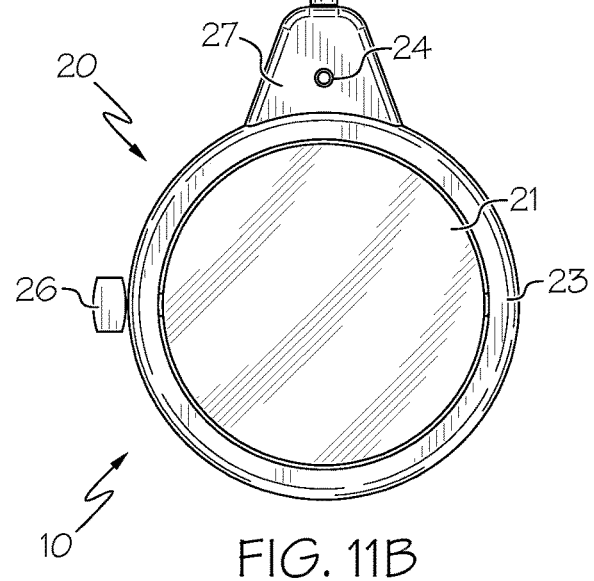
FIG. 11B illustrates a front view of an embodiment of a mirror assembly with the hanger bracket extended and engaged over a door or ledge.
Figure 12A:
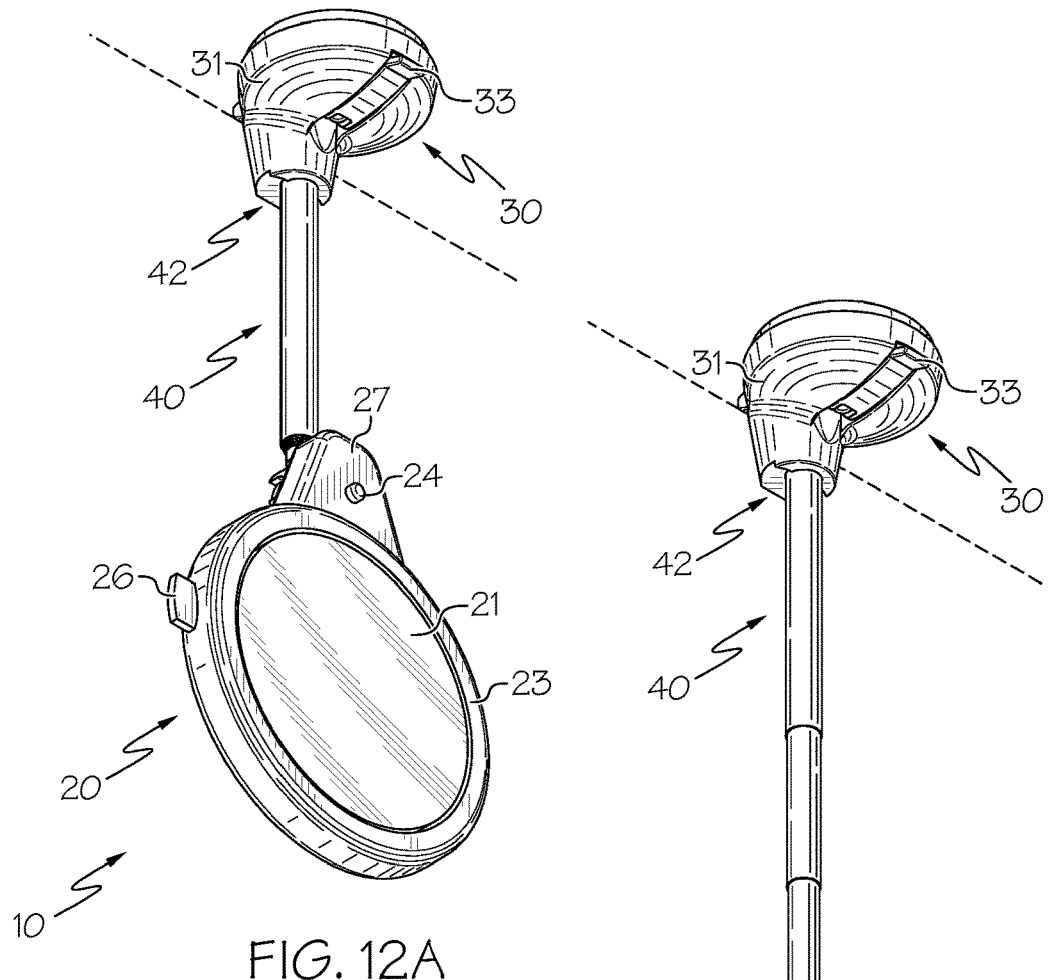
FIG. 12A illustrates a bottom perspective view of an embodiment of a mirror assembly with the hanger bracket extended and engaged over a door or ledge.
Figure 12B:
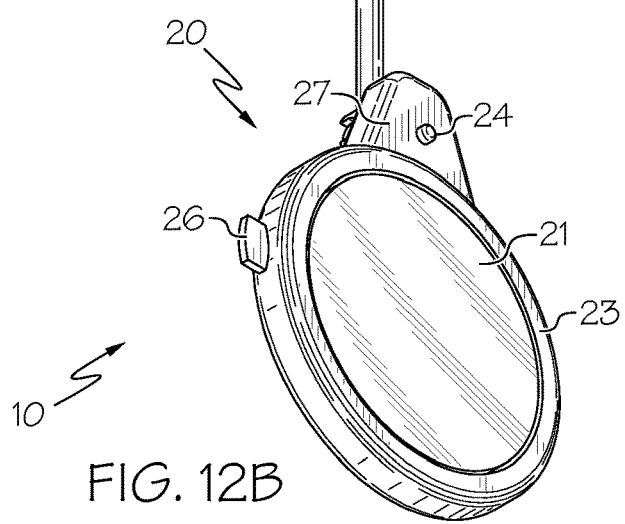
FIG. 12B illustrates a bottom perspective view of an embodiment of a mirror assembly with the hanger bracket extended and engaged over a door or ledge.
Figure 14:
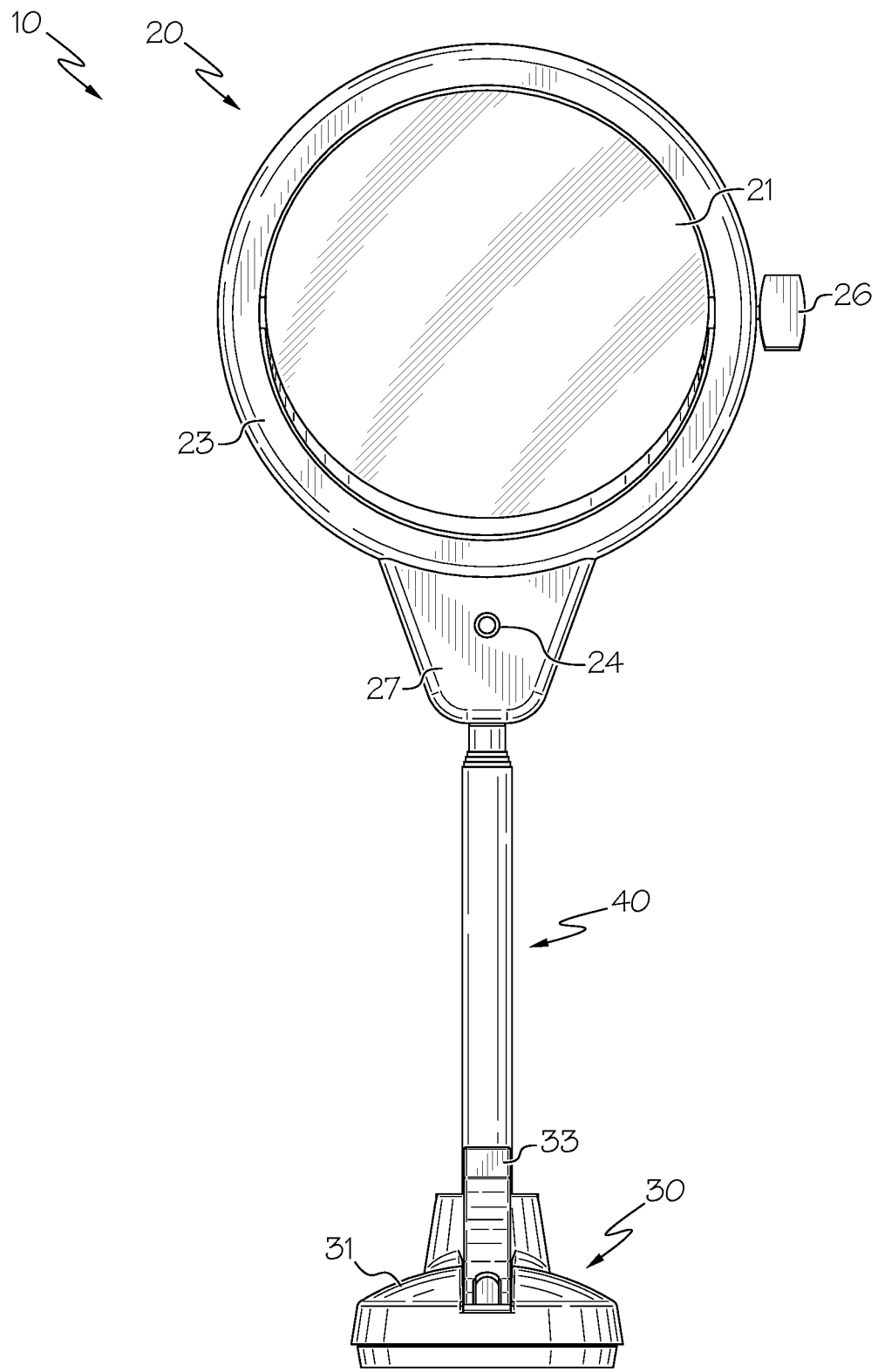
FIG. 14 illustrates a front view of an embodiment of a mirror assembly with the telescoping rod retracted, trigger arm disengaged, and reflective surfaces partially rotated.
Figure 15:
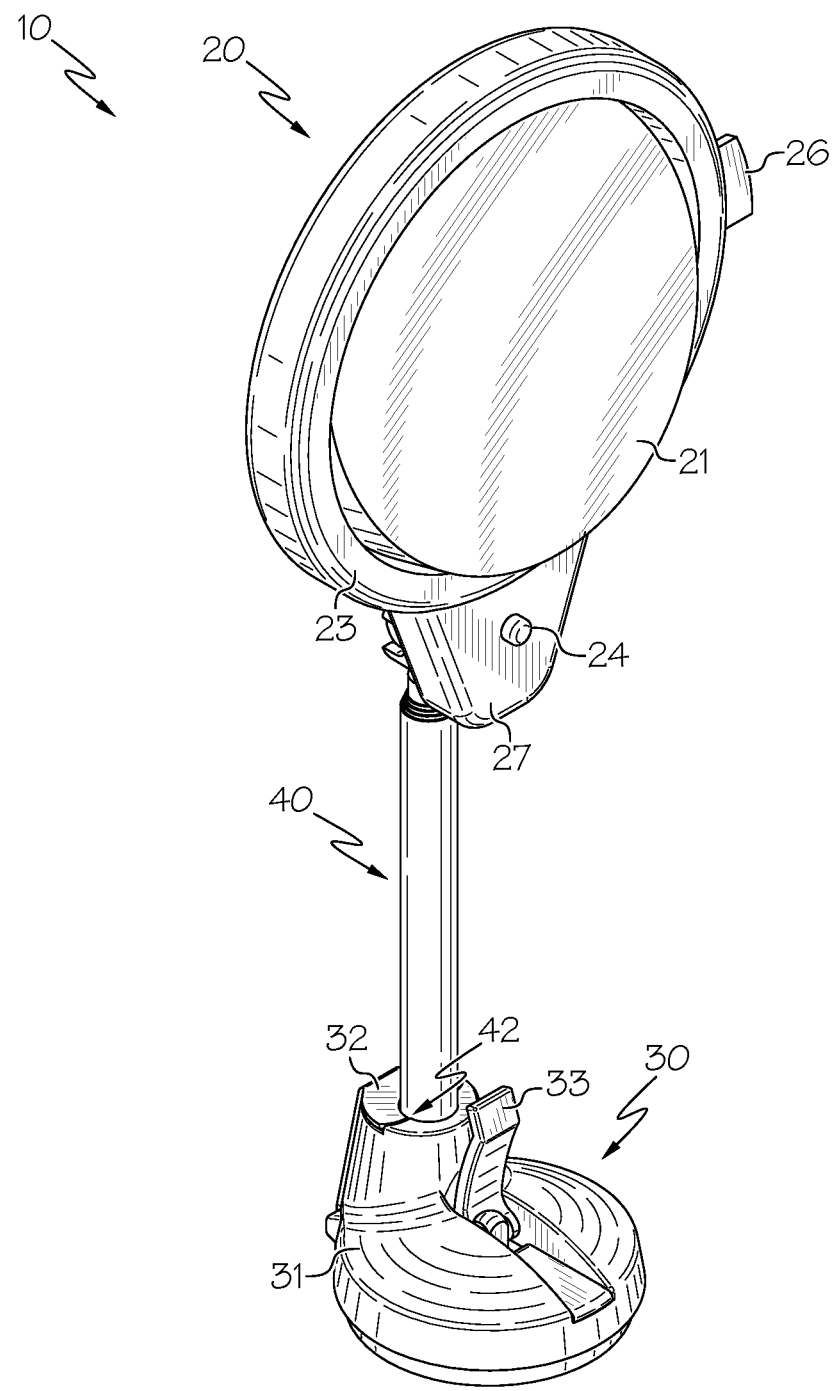
FIG. 15 illustrates a front perspective view of an embodiment of a mirror assembly with the telescoping rod retracted, trigger arm disengaged, hanger bracket retracted, and reflective surfaces partially rotated.
Figure 16:
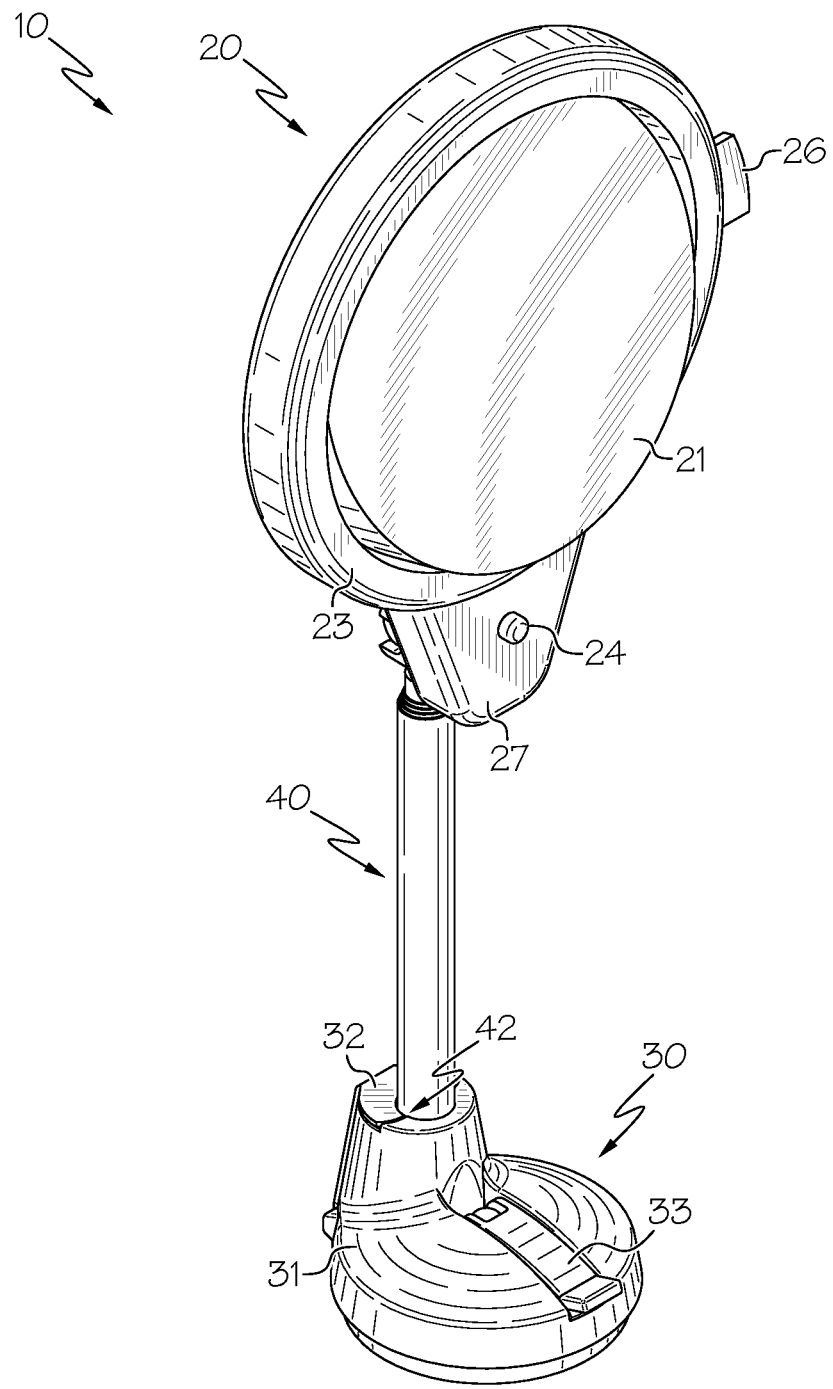
FIG. 16 illustrates a front perspective view of an embodiment of a mirror assembly with the telescoping rod retracted, trigger arm engaged, hanger bracket retracted, and reflective surfaces partially rotated.
Figure 17:
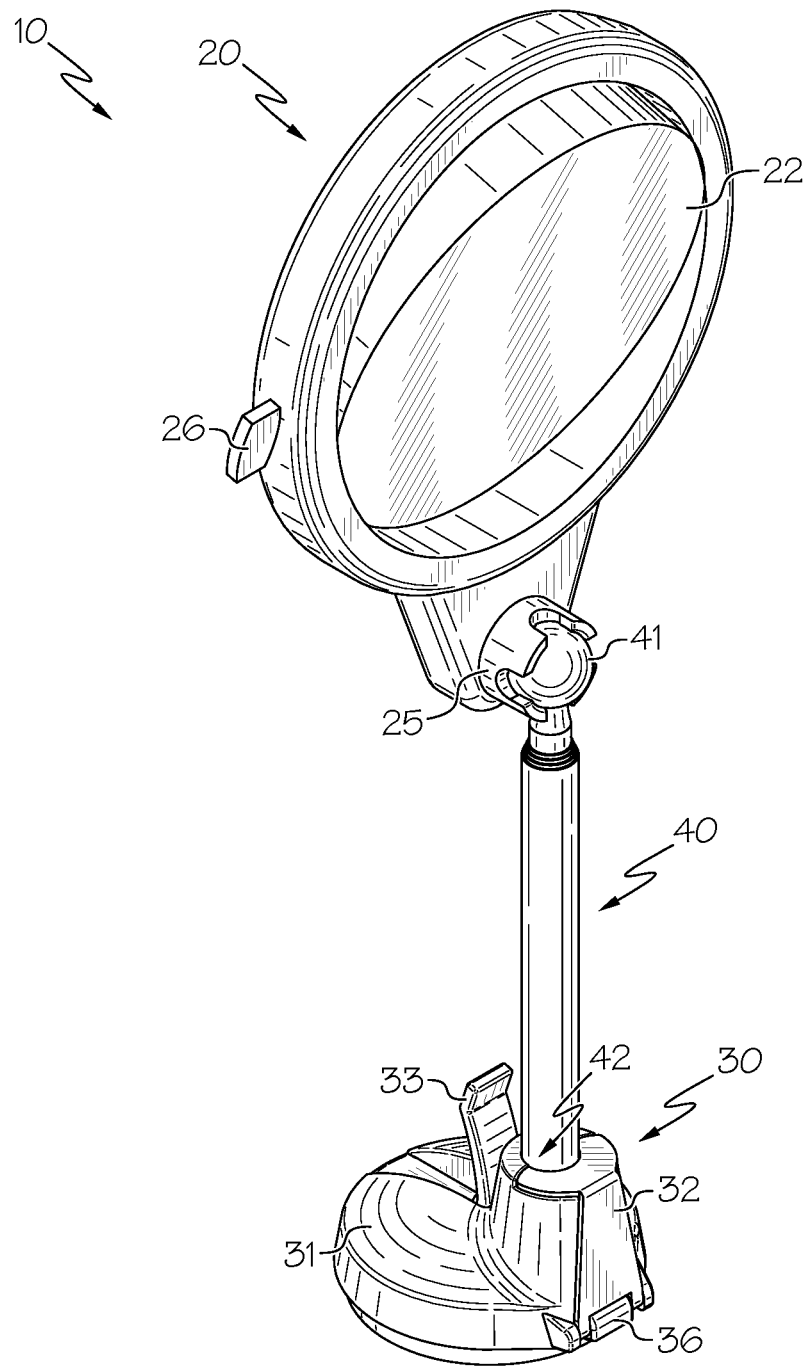
FIG. 17 illustrates a rear perspective view of an embodiment of a mirror assembly with the telescoping rod retracted, trigger arm disengaged, hanger bracket retracted, and reflective surfaces partially rotated.
Figure 18:
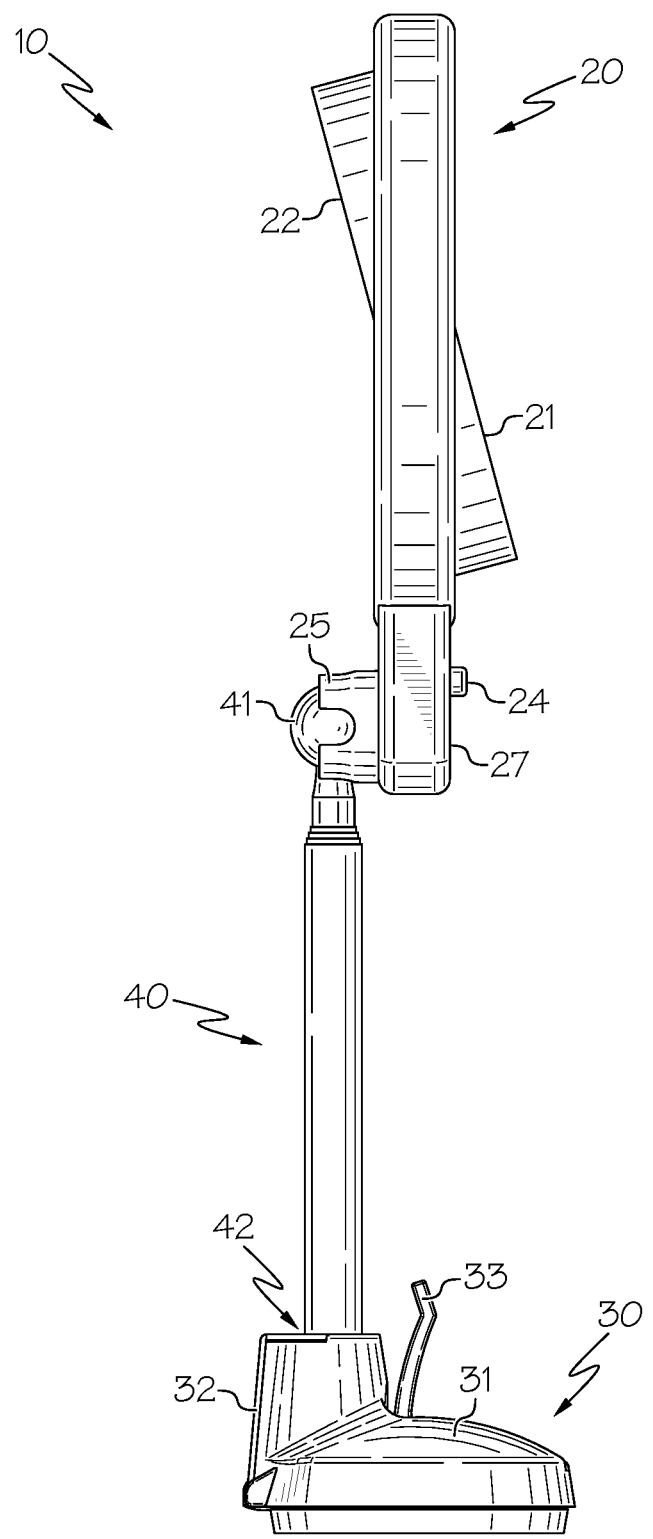
FIG. 18 illustrates a side view of an embodiment of a mirror assembly with the telescoping rod retracted, trigger arm disengaged, hanger bracket retracted, and reflective surfaces partially rotated.

The hanger bracket 32 is secured to hinge plate 36 of the suction cup base assembly 30 using a hinge assembly 35. The hinge assembly 35 permits the hanger bracket 32 to extend as shown in FIG. 9, and retract, as shown in FIG. 4, thereby facilitating the compact storage or transport of the mirror assembly 10. The hinge assembly 35 may include a roll pin to support the hanger bracket 32 when it is used to hang the mirror assembly 10 from a door, ledge, or the like. In some embodiments, the hinge assembly 35 may use a solid pin or set screws to support the hanger bracket 32 when it is used to hang the mirror assembly 10 from a door, ledge, or the like. A physical stop is molded into hinge plate 36 to prevent the hanger bracket 32 from rotating further than 90° relative to the suction cup assembly 30.

A telescoping rod 40 extends between the suction cup base assembly 30 and the mirror 20. In some embodiments, the first end 41 of the telescoping rod 40 is secured to the housing 27 of the mirror 20 using a ball joint. The ball joint allows the user of the mirror assembly 10 to pivot and adjust the mirror 20 to obtain the desired position. The second end 42 of the telescoping rod 40 is secured to the housing portion 31 of the suction cup base assembly 30, by, for example, a swivel joint such that the suction cup base assembly 30 may be stored against the telescoping rod 40 when the mirror assembly 10 is not in use, thereby facilitating the compact storage or transport of the mirror assembly 10. The telescoping rod 40 may be retracted or extended in order to adjust the height of the mirror 20 or distance from the user or to facilitate the compact storage or transport of the mirror assembly 10.

Additionally, a smooth disc of, for example, 5" in diameter, may be provided to enhance the stability of the mirror assembly 10 when the telescoping rod 40 is fully extended by removably mounting the suction cup base assembly 30 to the disc using the suction cup 34, thereby providing a larger footprint and increased stability to the mirror assembly 10.

In another embodiment, a mirror assembly comprises a mirror, a suction cup base assembly, and a telescoping rod. The mirror may be substantially hemispherical in shape, comprising a flat, circular reflective surface disposed on the front side of the planar surface of the hemisphere, and a housing disposed on the reverse side of the planar surface of the hemisphere. The housing may have a socket for use in a ball joint by which a first end of a telescoping rod may be secured to the housing. Additionally, there may be one or more light sources disposed at the periphery of the reflective surface. The light source or sources may be powered by a battery (e.g., a rechargeable battery) or may be plugged into an electrical outlet, for example. The light source or sources may be activated and deactivated by a switch, or the like, which may be located adjacent the light source on the front side of the planar surface of the hemisphere, or on the reverse side, for example. The reflective surface may be non-magnifying or may be magnifying, providing magnification at a level of, for example, 1×, 3×, 5×, 7×, 10×, 15×, or 20×.

It will be understood by persons skilled in the art that modifications may be made to the embodiments described herein while remaining within the scope of the claimed invention.

What is claimed is:

1. A vanity mirror assembly comprising:
   a mirror;
     the mirror comprising a mirror housing and at least two reflective surfaces;
   a suction cup base assembly;
     the suction cup base assembly comprising a suction cup base assembly housing, a hanger bracket, and at least one suction cup;
   a telescoping rod extending between the mirror and the suction cup base assembly;
   wherein a first end of the telescoping rod is secured to the mirror housing and a second end of the telescoping rod is secured to the suction cup base assembly housing;
   wherein the at least two reflective surfaces are rotatable about an axis perpendicular to a vertical axis of the telescoping rod.

2. The vanity mirror assembly of claim 1, wherein one or more light sources is disposed at a periphery of the mirror housing.

3. The vanity mirror assembly of claim 2, wherein one of the at least two reflective surfaces is a 3× magnification mirror.

4. The vanity mirror assembly of claim 2, wherein one of the at least two reflective surfaces is a 5× magnification mirror.

5. The vanity mirror assembly of claim 2, wherein one of the at least, two reflective surfaces is a 7× magnification mirror.

6. The vanity mirror assembly of claim 2, wherein one of the at least two reflective surfaces is a 10×magnification mirror.

7. The vanity mirror assembly of claim 2, wherein one of the at least two reflective surfaces is a 15× magnification mirror.

8. The vanity mirror assembly of claim 2, wherein one of the at least two reflective surfaces is a 20× magnification mirror.

9. The vanity mirror assembly of claim 1, wherein one of the at least two reflective surfaces is a 3× magnification mirror.

10. The vanity mirror assembly of claim 1, wherein one of the at least two reflective surfaces is a 5× magnification mirror.

11. The vanity mirror assembly of claim 1, wherein one of the at least two reflective surfaces is a 7× magnification mirror.

12. The vanity mirror assembly of claim 1, wherein one of the at least-two reflective surfaces is a 10×magnification mirror.

13. The vanity mirror assembly of claim 1, wherein one of the at least two reflective surfaces is a 15× magnification mirror.

14. The vanity mirror assembly of claim 1, wherein one of the at least two reflective surfaces is a 20× magnification mirror.

15. A vanity mirror assembly comprising:
    a mirror;
      the mirror comprising a mirror housing and at least two reflective surfaces;
    wherein one or more light sources are disposed at a periphery of the mirror housing and wherein the at least two reflective surfaces are rotatable relative to the one or more light sources;
    a suction cup base assembly;
      the suction cup base assembly comprising a suction cup base assembly housing, a hanger bracket, and at least one suction cup;
    a telescoping rod extending between the mirror and the suction cup base assembly;
    wherein a first end of the telescoping rod is secured to the mirror housing and a second end of the telescoping rod is secured to the suction cup base assembly housing.

\* \* \* \* \*